United States Patent
Amelunxen et al.

(10) Patent No.: US 7,824,633 B2
(45) Date of Patent: Nov. 2, 2010

(54) SYSTEM AND METHOD FOR CONVERSION OF MOLYBDENITE TO ONE OR MORE MOLYBDENUM OXIDES

(75) Inventors: Peter Amelunxen, Arequipa (PE); John C. Wilmot, Anthem, AZ (US); Chris Easton, Highlands Ranch, CO (US); Wayne W. Hazen, Lakewood, CO (US)

(73) Assignee: Freeport-McMoran Corporation, Phoenix, AZ (US)

( * ) Notice: Subject to any disclaimer, the term of this patent is extended or adjusted under 35 U.S.C. 154(b) by 0 days.

(21) Appl. No.: 11/780,850

(22) Filed: Jul. 20, 2007

(65) Prior Publication Data
US 2008/0118422 A1    May 22, 2008

Related U.S. Application Data

(60) Provisional application No. 60/866,763, filed on Nov. 21, 2006.

(51) Int. Cl.
C01G 37/14 (2006.01)
(52) U.S. Cl. ............... 423/58; 423/53; 423/54; 423/55; 423/593.1; 423/606
(58) Field of Classification Search ........... 423/58, 423/53, 54, 55, 593.1, 606
See application file for complete search history.

(56) References Cited

U.S. PATENT DOCUMENTS

| 1,923,652 A | 8/1933 | Winkler et al. |
| 3,117,860 A | 1/1964 | Bjerkerud et al. |
| 3,674,424 A | 7/1972 | Stanley et al. |
| 3,829,550 A | 8/1974 | Ronzio et al. |
| 3,834,893 A | 9/1974 | Queneau et al. |
| 3,854,930 A | 12/1974 | Kentro |
| 3,860,419 A | 1/1975 | Weber et al. |
| 3,911,076 A | 10/1975 | Probert et al. |
| 3,932,580 A | 1/1976 | Vertes et al. |

(Continued)

FOREIGN PATENT DOCUMENTS

WO       WO9612675       5/1996

(Continued)

OTHER PUBLICATIONS

A.G. Kholmogorov, et al., "Ion exchange recovery and concentration of rhenium from salt solutions", Hydrometallurgy 51 (1999( 19-35, Elsevier Science B.V.

(Continued)

Primary Examiner—Melvin C Mayes
Assistant Examiner—Melissa Stalder
(74) Attorney, Agent, or Firm—Snell & Wilmer L.L.P.

(57) ABSTRACT

A system and method for producing molybdenum oxide(s) from molybdenum sulfide are disclosed. The system includes a pressure leach vessel, a solid-liquid separation stage coupled to the pressure leach vessel, a solvent-extraction stage coupled to the solid-liquid separation stage, and a base stripping stage coupled to the solvent-extraction stage. The method includes providing a molybdenum sulfide feed, subjecting the feed to a pressure leach process, subjecting pressure leach process discharge to a solid-liquid separation process to produce a discharge liquid stream and a discharge solids stream, and subjecting the discharge liquid stream to a solvent extraction and a base strip process.

14 Claims, 3 Drawing Sheets

U.S. PATENT DOCUMENTS

| | | | |
|---|---|---|---|
| 3,941,867 | A | 3/1976 | Wilkomirsky et al. |
| 3,988,418 | A | 10/1976 | Kerfoot et al. |
| 4,000,244 | A | 12/1976 | Mollerstedt et al. |
| 4,006,212 | A | 2/1977 | Alper et al. |
| 4,046,852 | A * | 9/1977 | Vertes et al. ................... 423/58 |
| 4,079,116 | A | 3/1978 | Ronzio et al. |
| 4,083,921 | A | 4/1978 | Wesely |
| 4,138,248 | A | 2/1979 | Narain |
| 4,165,362 | A | 8/1979 | Reynolds |
| 4,207,296 | A | 6/1980 | Nauta et al. |
| 4,236,918 | A | 12/1980 | Narain |
| 4,273,745 | A | 6/1981 | Laferty et al. |
| 4,296,077 | A | 10/1981 | Heuer et al. |
| 4,379,127 | A | 4/1983 | Bauer et al. |
| 4,444,733 | A | 4/1984 | Laferty et al. |
| 4,478,698 | A | 10/1984 | Wilkomirsky et al. |
| 4,500,496 | A | 2/1985 | Austin et al. |
| 4,525,331 | A | 6/1985 | Cheresnowsky et al. |
| 4,551,312 | A | 11/1985 | Yuill |
| 4,555,386 | A | 11/1985 | Cheresnowsky |
| 4,596,701 | A | 6/1986 | Cheresnowsky et al. |
| 4,601,890 | A | 7/1986 | Cheresnowsky |
| 4,604,266 | A | 8/1986 | Cheresnowsky et al. |
| 4,604,267 | A | 8/1986 | Cheresnowsky |
| 4,861,565 | A * | 8/1989 | Sefton et al. ................... 423/55 |
| 5,804,151 | A * | 9/1998 | Sweetser et al. ............... 423/58 |
| 5,820,844 | A | 10/1998 | Khan et al. |
| 6,149,883 | A | 11/2000 | Ketcham et al. |
| 6,730,279 | B2 | 5/2004 | Balliett et al. |
| 7,169,371 | B2 | 1/2007 | Jones |
| 2005/0019247 | A1 * | 1/2005 | Balliett et al. ............ 423/592.1 |
| 2008/0124269 | A1 | 5/2008 | Daudey et al. |
| 2008/0166280 | A1 | 7/2008 | Daudey et al. |

FOREIGN PATENT DOCUMENTS

| | | |
|---|---|---|
| WO | WO9966085 | 12/1999 |
| WO | WO2008061231 | 5/2008 |

OTHER PUBLICATIONS

Notification of Transmittal of the International Search Report and the Written Opinion of the International Searching Authority, or the Declaration in PCT/US2007/084496 issued Jul. 29, 2008.

* cited by examiner

SYSTEM AND METHOD FOR CONVERSION OF MOLYBDENITE TO ONE OR MORE MOLYBDENUM OXIDES

CROSS REFERENCE TO RELATED APPLICATIONS

This application claims the benefit of provisional application Ser. No. 60/866,763, entitled SYSTEM AND METHOD FOR CONVERSION OF MOLYBDENITE TO ONE OR MORE MOLYBDENUM OXIDES, filed Nov. 21, 2006.

FIELD OF INVENTION

The present invention generally relates to the processing of molybdenum and more particularly to the production of molybdenum oxide materials (e.g., molybdenum trioxide, $MoO_3$) from molybdenum sulfide (e.g., $MoS_2$).

BACKGROUND OF THE INVENTION

Molybdenum is an increasingly important material and is used for various industrial and scientific purposes. These purposes range from imparting strength in metal alloys to use as a chemical catalyst. Likewise, molybdenum compositions are highly suitable for the production of a wide variety of products, including electrical contacts, electrical filaments, colloidal lubricant additives, and other diverse products.

Molybdenum does not occur as a free element in nature. In nature it can be found in various common forms, such as in ore in the form of molybdenite ($MoS_2$). Molybdenite generally forms a relatively small percentage of the ore in which it is found. Typically, molybdenite ore consists of silicified granite compositions having deposits of soft, black, and hexagonal $MoS_2$ crystalline structures widely dispersed therein. These materials are found in an average concentration of only about less than 1% by weight of the entire ore body. Accordingly, significant process steps are typically required in order to recover molybdenum from ore.

In view of its increasing industrial and scientific importance, substantial research activity has been devoted to the development of improved methods for the beneficiation of $MOS_2$-containing ore products. Normally, $MoS_2$ derived from molybdenite ore is converted by oxidization to various oxides of molybdenum, followed by further processing in order to obtain a purified molybdenum oxide product consisting primarily of molybdenum trioxide ($MoO_3$).

The molybdenite ore may be initially subjected to a physical grinding process in which the ore is reduced in size to a plurality of small particles. The ore particles are then further treated to remove the desired $MoS_2$. This step may be accomplished using a variety of techniques, including organic flotation extraction procedures. As a result, the desired $MoS_2$ may be effectively separated from ore-based waste materials (conventionally known as "gangue") which consist primarily of silica-containing by-products. Specifically, the desired $MoS_2$ compositions will, by control of the surface chemistry within the flotation unit, be readily isolated in the flotation froth. Many variations and alternatives exist in connection with the isolation of $MoS_2$ from the ore, with the selected procedure depending on the type and grade of ore to be processed.

Once isolated, $MoS_2$ may converted (oxidized) to form $MoO_3$ by forming a slurry or suspension of $MoS_2$ in water and thereafter heating the slurry in a pressure leach vessel. During the heating process, an oxygen atmosphere is maintained within the vessel. As a result, $MoO_3$ is generated in accordance with one or more variations of the following exothermic reaction.

$$MoS_2 + 4.5O_2(g) + 2H_2O \rightarrow MoO_3 + 2H_2SO_4$$

Several patents and other literature have taught numerous processes and systems for carrying out one or more variations on the above reaction to greater or lesser degrees of completion. Some of the patents which discuss this type of process include: U.S. Pat. No. 4,046,852 to Vertes, et al., entitled "Purification Process for Technical Grade Molybdenum Oxide"; U.S. Pat. No. 4,165,362 to Reynolds, entitled "Hydrometallurgical Processing of Molybdenite Ore Concentrates"; U.S. Pat. No. 4,379,127 to Bauer, et al., entitled "Method of Recovering Molybdenum Oxide"; U.S. Pat. No. 4,444,733 to Laferty, et al., entitled "Process for Recovering Molybdenum and Copper From Sulfide Concentrates"; U.S. Pat. No. 4,478,698 to Wilkomirsky, et al., entitled "Process For Recovering Copper and Molybdenum From Low Grade Copper Concentrates"; U.S. Pat. No. 4,512,958 to Bauer, et al., entitled "Method of Recovering Molybdenum Oxide"; U.S. Pat. No. 5,804,151 to Sweetser, et al., entitled "Process For Autoclaving Molybdenum Disulfide"; and U.S. Pat. No. 5,820,844 to Khan, et al., entitled "Method for the Production of A Purified $MoO_3$ Composition."

Many of these patents and other publications focus on the oxidation reaction that converts some or all of the $MoS_2$ to $MoO_3$ or other molybdenum oxides, which other oxides may be referred to as lesser molybdenum oxides. While the oxidation reaction is an important step in the preparation of molybdenum oxide from molybdenum-containing ore, the process for obtaining usable molybdenum typically includes numerous post-oxidation reaction steps that are important to the overall efficiency of the process.

U.S. Pat. No. 6,730,279, to Balliett et al., entitled "Production of Pure Molybdenum Oxide from Low Grade Molybdenite Concentrates," which issued on May 4, 2004, illustrates possible post-oxidation steps. For example, a process illustrated in Balliett et al. includes an oxidation step, followed by a separation step to separate the molybdenum oxide material from a centrate. The centrate is sent to an optional amine solvent-extraction process operated to produce a two-phase mixture having a molybdenum-loaded organic phase and an aqueous phase. The organic phase is stripped with concentrated sulfuric acid, at a pH less than about 3 and the recovered molybdenum values are recycled back to the oxidation step. Although the inventors purport that this process works, some results indicate otherwise. Furthermore, use of concentrated sulfuric acid to strip the organic material is detrimental to most processing equipment and thus increases operating costs of molybdenum recovery systems and processes. Accordingly, improved methods and systems for efficiently obtaining molybdenum oxide from molybdenite concentrates that do not employ sulfuric acid stripping are desired.

SUMMARY OF THE INVENTION

The present invention provides a method and a system for converting molybdenite ($MoS_2$) to one or more molybdenum oxides. While the ways in which the present invention addresses the various drawbacks of the prior art will be discussed in greater detail below, in general, the invention provides a system and method for recovering a high yield of molybdenum oxide using a relatively non-corrosive stripping process.

In accordance with various embodiments of the invention, a method for converting molybdenite to molybdenum oxides includes optionally deoiling the molybdenite concentrate, optionally metallurgically upgrading the concentrate, pressure leaching a slurry of molybdenite concentrate, separating the pressure leach discharge solids from the pressure leach discharge liquid, optionally washing the resultant discharge solids, extracting soluble molybdenum and optionally other materials from a resultant filtrate using organic anionic solvent extraction techniques and/or ion exchange techniques, stripping the loaded organic material with a basic solution (e.g., an alkali metal base solution, such as a solution including an alkali metal hydroxide, alkali metal carbonate or bicarbonate, or an alkaline earth metal base solution, such as a solution including an alkaline earth metal carbonate or bicarbonate) recycling the strip solution or a portion thereof to the pressure leach operation, feed slurry tank, and/or a quench solution system, optionally extracting sodium from the recycle strip solution with a strong cationic ion-exchange resin prior to recycling the molybdenum solution to the pressure leach system, and removing a small stream of concentrated strip solution to recover other materials.

In accordance with additional embodiments of the invention, a system for converting molybdenite to molybdenum oxides includes (optionally) a deoiler, (optionally) a metallurgical upgrade stage, a pressure leach vessel, a solid-liquid separation stage or stages, a solvent-extraction stage and/or a an ion exchange stage, a stripping stage, and optionally a cation-exchange stage.

In accordance with various aspects of the exemplary embodiments, molybdenum oxide is recovered from molybdenum sulfide by initially providing filtered, dried, and optionally deoiled and/or upgraded $MoS_2$, which may be fed directly from a prior concentration/isolation process step, repulped after such process steps, and/or provided from some other source of $MoS_2$ concentrate. The $MoS_2$ concentrate is fed into a pressure leach vessel operating at, e.g., about 225° C. and about 450 psi and about 100 oxygen psi overpressure. The $MoS_2$ concentrate may be fed to the pressure leach vessel continuously. An oxygenated environment may be maintained in the pressure leach vessel through any suitable method, such as sparging oxygen into the pulp zone at about 100 psi overpressure. Additionally, quench water and/or or coolant may be added to the vessel to maintain temperature and pressure. The pressure leach vessel may also receive a recycle stream including at least a portion of a liquid stream from a solid-liquid separation stage. In some implementations, the recycle stream from the solid-liquid separation stage overflow may improve the oxidation kinetics in the vessel and thus improve the overall recovery percentage of molybdenum from the molybdenum sulfide.

The discharge from the pressure leach vessel may be depressurized in a flash tank before proceeding to the solid-liquid separation stage. In some configurations of the solid-liquid separation stage, at least 2 thickeners are operated in counter-current mode. A portion of the solid-liquid separation stage leach liquor from, e.g., a first thickener may report to a solution extraction (SX) and/or an ion exchange circuit while another portion of the leach liquor may be recirculated or recycled back to the feed stream of the pressure leach vessel. The solid-liquid separation stage liquid fraction stream proceeding to the solution extraction circuit may be filtered in one or more filtration stages before proceeding to the SX circuit. In the SX circuit, solubilized materials, such as Mo and Re values are removed from the solid-liquid separation stage liquid fraction stream via an organic stage. The loaded organic is then washed and materials (e.g., the Mo and Re values) are stripped with a basic solution. The aqueous solution including the, e.g., Mo and Re, values may then be further processed for final upgrading of rhenium and molybdenum. The SX circuit may also produce a copper bearing acid solution, which may be further processed for reclamation or recycling of the acid and the copper.

In continuing discussion of some exemplary configurations of the solid-liquid separation stage, the solids residue from the solid-liquid separation stage (e.g., the last thickener thereof) is filtered using a filtration unit. The filtration unit may include a rotating drum, belt, pressure filter, or other conventional filter. The filtrate is returned to the solid-liquid separation stage, to the solution extraction stage, and/or fed to the pressure leach vessel feed stream. The filter cake from the filtration step includes oxide product, which may be utilized or sent to further processing.

As one example of additional processing of the oxide, the wet filter cake from the filtration step described above may be further processed to produce one or more of commercial products or chemical product precursors, such as, for example, an ammonium dimolybdate (ADM) product.

Many features of the present disclosure will become manifest upon making reference to the detailed description which follows and the accompanying sheets of drawings in which preferred embodiments incorporating the principles of this disclosure are provided as illustrative examples only.

BRIEF DESCRIPTION OF THE DRAWING FIGURES

DETAILED DESCRIPTION

The present disclosure refers to and describes a method, a processing system, and accompanying components and equipment. A substantial portion of the disclosure herein is directed to a system for and a method of processing molybdenite concentrates to produce molybdenum oxide and other compositions. It should be appreciated that the broader process steps described herein may be accomplished by a variety of equipment configurations and sub-process steps, each of which are within the scope of the present invention. For example, the following disclosure describes filter systems on a number of occasions. Particular equipment is generally described as being suitable for particular filter systems. However, other equipment may be implemented or combined with other equipment to accomplish the function of a filter system described herein. Additionally or alternatively, the present system and method may be implemented or adapted to process other starting materials and/or to produce different final products.

Figure 1:
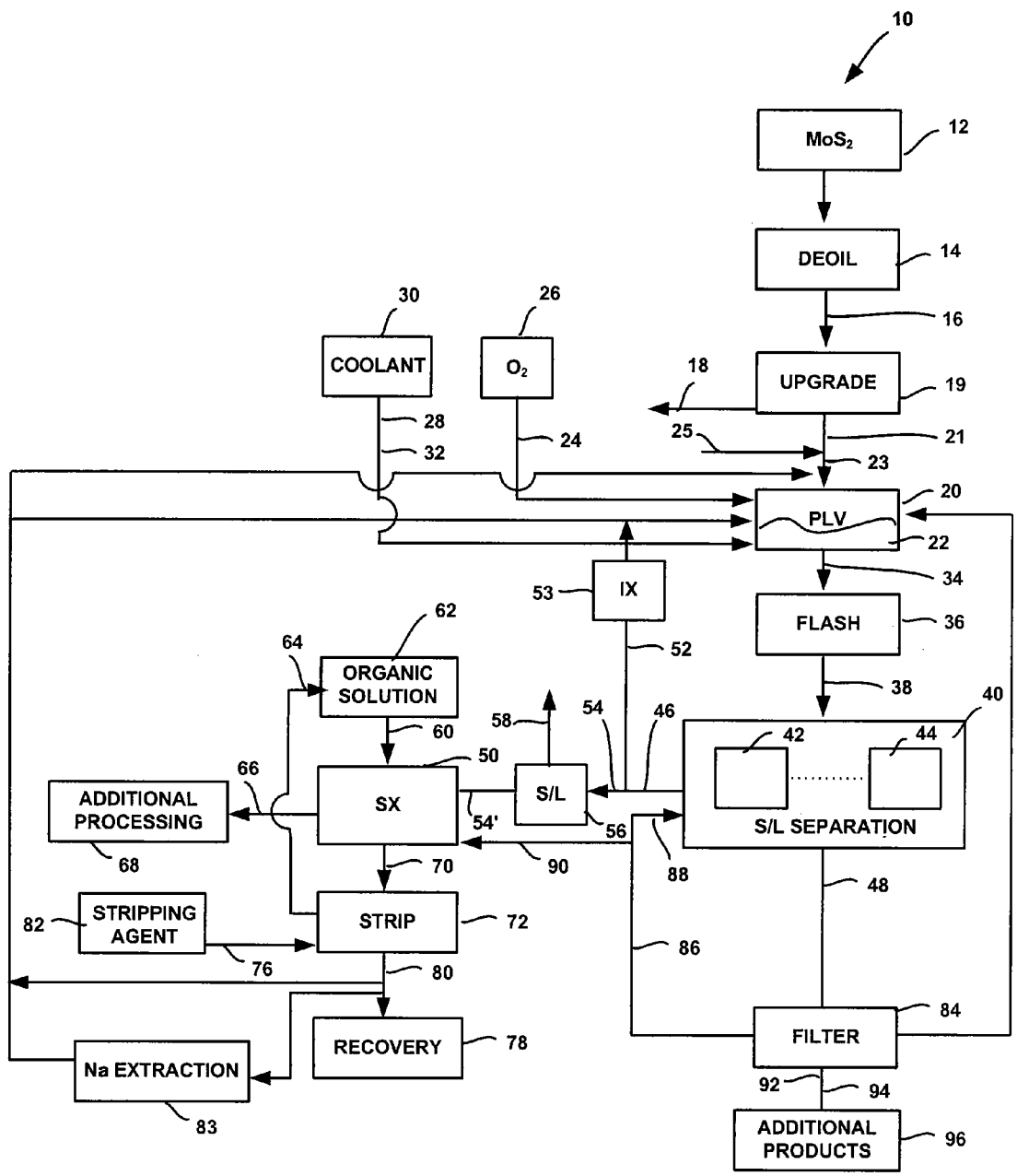
FIG. 1 illustrates a system for converting $MoS_2$ concentrate to molybdenum oxide.
Figure 2:
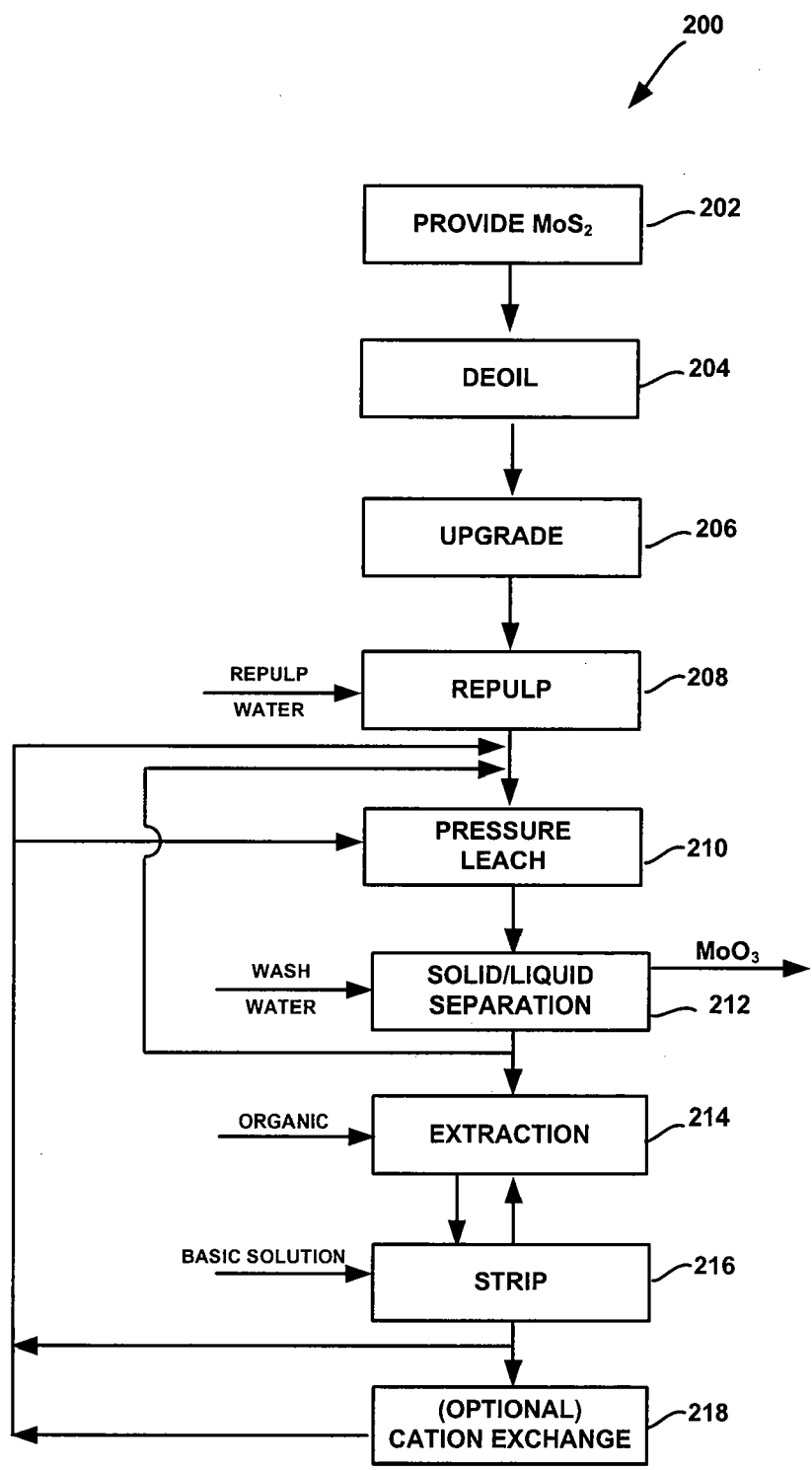
FIG. 2 illustrates a process for converting $MoS_2$ concentrate to molybdenum oxide.

With reference to FIG. 1 and FIG. 2, a system 10 and a process 200 to generate molybdenum oxide product ($MoO_3$) from $MoS_2$ starting materials are respectfully illustrated. The system components and process steps are illustrated in block diagram format to re-emphasize that the present invention is not limited to any specific hardware or processing equipment, with many different types of operating components being suitable for use in the disclosed system and process.

As illustrated in FIG. 1 and FIG. 2, process 200 initially involves a step 202 of providing a supply of molybdenum sulfide ($MoS_2$), designated as reference number 12 in FIG. 1. Many of the initial steps in process 200, such as obtaining a molybdenum sulfide supply 12, are somewhat conventional and taught by numerous patents, including U.S. Pat. No. 5,804,151, which shares common ownership with the present application. For the purposes of completeness, a brief description of these initial steps is provided herein in substantially the same form as provided in U.S. Pat. No. 5,804,151, which is incorporated herein by reference in its entirety for all purposes.

To obtain initial $MoS_2$ starting material 12, molybdenum sulfide is derived from a supply of molybdenite ($MoS_2$-containing) ore (not shown), which is available from numerous mine sites throughout the world. For example, a representative mine site from which large supplies of molybdenite ore may be obtained is the Henderson mine at Empire, Colo. (USA). This mine site is generally characterized as a "primary" mine which is capable of producing large amounts of relatively pure product. However, of increasing interest is "by-product" molybdenite, which involves a secondary product combined with copper-containing materials obtained from "nonprimary" mine sites (e.g., the Sierrita Mine at Tucson, Ariz. (USA) and others). System 10 and process 200 are capable of effectively processing both "primary" and "secondary" ore materials and should not be regarded as limited to any one type.

Once obtained, the molybdenite ore may be thereafter processed in a conventional manner to separate the desired $MoS_2$ from the surrounding waste material which is normally comprised of silicified granite and is commonly referred to as "gangue." A basic procedure for isolating the $MoS_2$ from other components of the molybdenite ore is described in U.S. Pat. No. 4,046,852 to Vertes et al., which is hereby incorporated by reference for all that it discloses. Essentially, the molybdenite ore, which may contain only about less than 1% by weight $MoS_2$ in the form of black, hexagonal crystals, is first subjected to a size reduction stage using a conventional size reduction (e.g., grinding and crushing) apparatus known in the mining industry for this purpose. A representative size reduction apparatus suitable for use with the system and process of the invention includes a standard impact milling system or roll crusher unit. However, other grinding and crushing systems may also be used, with the present invention not being exclusively restricted to any particular type of size reduction apparatus.

As a result of the grinding and crushing step described above, the molybdenite ore is converted into a ground ore product which is typically in particulate form having an average particle size of about 50 to about 300 micrometers. Thereafter, the ground ore product may be treated in many different ways to separate the desired $MoS_2$ therefrom. For example, the ground ore product may be introduced into a conventional flotation extraction system which employs numerous reagents including various hydrocarbon compositions, as well as selected wetting agents. Flotation extraction systems are known in the mining industry, with specific information involving a representative flotation-based extraction system for processing molybdenite ore being described in U.S. Pat. No. 4,046,852, discussed above, and U.S. Pat. No. 3,834,894 to Spedden, et al., which is also incorporated herein by reference for all that it discloses. A wide variety of different flotation chemicals may be used in connection with conventional flotation systems of the type described above including, but not limited to, butyl carbitol, allyl esters, and potassium xanthates. Typically, the "float" product associated with a representative flotation extraction system will contain the desired isolated molybdenum sulfide that can be used as starting material 12. The "sink" product is primarily of the waste gangue, which may be discarded or further processed if desired. Of course, it is common that such flotation extraction processes often utilize multiple, sequential flotation stages and may include intervening grinding steps, depending on the particular type of ore being processed and other extrinsic considerations. Consequently, the present invention should not be regarded as limited to any particular flotation extraction procedures or other processes for obtaining molybdenum sulfide 12, with many other conventional techniques being applicable as discussed above.

At this stage, initial supply of molybdenum sulfide 12 is ready for further processing, and will typically have a particle size of about 10 to about 100 micrometers. Initial supply of molybdenum sulfide 12 will likely have a number of residual compositions associated therewith, which originated within the ore product. Specifically, these materials are carried over into initial supply of molybdenum sulfide 12 from the ground ore product, with initial supply of molybdenum sulfide 12 normally containing about 0.2-35% by weight non-$MoS_2$ materials. These non-$MoS_2$ materials will typically include small amounts of residual gangue as well as various gangue-derived metals and metal compounds (e.g., metal oxides, chlorides, sulfides, and the like) which include, but are not limited to, the following metals: potassium, manganese, sodium, lead, tin, magnesium, calcium, iron, copper, bismuth, and aluminum. The exact amount and concentration of these materials within molybdenum sulfide starting material 12 (with such materials collectively being referred to herein as "contaminants") will, of course, vary depending on the particular ore body from which the initial ore was obtained, as well as the level and/or type of preliminary treatment used to produce molybdenum sulfide starting material 12. As discussed further below, these naturally-derived contaminants may be removed at some point during the molybdenum purification process in order to prevent undesired contamination of the final molybdenum products (e.g., products generated from molybdenum trioxide ($MoO_3$) produced in accordance with process 200 described herein).

Depending on the level and type of contaminants present in molybdenum sulfide supply 12 and the filtration steps desired after the oxidation of the $MoS_2$ in a pressure leach vessel 20, $MoS_2$ supply 12 may be subjected to one or more additional purification steps prior to entering pressure leach vessel 20. For example, initial molybdenum sulfide supply 12 may by subjected to an optional deoiling step 204 and system 10 may include optional deoiling apparatus 14. Deoiling can be used to strip hydrocarbon material from the feed to produce an upgraded feed 16, which increases the effective kinetics of a pressure leach step 210, described in more detail below. Thus, incorporation of a deoiling stage facilitates maintenance of equipment of system 10 by reducing an amount of hydrocarbon material that is exposed to the equipment and increases efficiency of process 200.

Deoiling step 204 may be performed using either thermal or solvent deoiling techniques and apparatus. An exemplary thermal deoiling process includes, e.g., exposing the feed to an indirect fired rotary kiln. Exemplary solvent deoiling processes include exposing the feed to an acetone or other solvent wash stage(s).

The feed may also be exposed to an optional hydrometallurgical upgrade apparatus 19 (step 206). Optional hydrometallurgical upgrade step 206 may include various purification sub-steps that may be implemented prior to the pressure leach vessel and may include one or more sub-steps and apparatus 19 may include one or more hardware components to accomplish the step(s). Optional upgrade step 206 may involve leaching of molybdenum sulfide supply 12 with a selected reagent or reagents (e.g., HCl) to "upgrade" supply 12 or 16 to material 21, i.e., preliminarily remove, various contaminant materials from the molybdenum sulfide, such as extraneous lead. A representative hydrometallurgical upgrade step 206 may include the step of combining initial supply of molybdenum sulfide 12 or 16 with the selected reagent (e.g., HCl) in a vessel to form a slurry. The vessel may be provided with a stirrer to ensure a thorough dispersal of the solids in the slurry. The slurry may then be filtered by a suitable filter to produce upgraded molybdenum sulfide-containing feed material 21 and a filtrate 18 containing contaminants (e.g., lead) solubilized by the reagent. Filtrate 18 may then be disposed of or treated in any suitable manner. Again, it should be emphasized that hydrometallurgical upgrade step 206 is optional.

Although process 200 is illustrated with optional deoiling step 204 followed by optional hydrometallurgical upgrade step 206, when a process includes both steps 204, 206, the steps may be performed in any order. After either step, feed material 21 is optionally repulped with a liquid 25 (step 208) to form a feed material 23, which is fed to pressure leach vessel 20.

As noted above, steps 204, 206, and 208 are optional, and thus feed material 23, 21, 19, and starting material 12 may be the same or altered by the optional processing steps and apparatus as described above. In any event, $MoS_2$-containing feed material (e.g., feed 23) is fed to pressure leach vessel 20, whether directly from the $MoS_2$ supply 12 or from the optional upgrade steps 204, 206. Feed material 23 may comprise an aqueous slurry comprising water and $MoS_2$. Feed material 23 may assay at about 36-40% S, but may vary depending on the purity of the initial supply of molybdenum sulfide, the amount of contaminants, and treatment prior to entry of vessel 20. For example, it has been found that exposing feed material 12 to a deoiling process reduces an amount of total sulfur. Additionally or alternatively, the $MOS_2$-containing feed material 23 may be provided in other suitable forms depending on the preceding process steps. For example, $MOS_2$-containing feed material 23 may comprise a filter cake having less water than a slurry. As noted below, other streams may be fed to pressure leach vessel 20 to provide a suitable leach slurry 22 during an oxidation step in the pressure leach vessel (step 210).

By way of particular example, leach slurry 22 includes sulfuric acid to facilitate the oxidation reaction. And, in accordance with various aspects of the invention, a desired acid concentration is maintained by recirculating an acid discharge stream from step 212, as described below.

Pressure leach vessel 20 may be operated in either a batch mode or a continuous mode. Pressure leach vessel 20 may include a heater and one or more mixing motors having corresponding blades or agitators. Pressure leach vessel 20 may also include one or more sparger-type agitators through which a free oxygen-containing gas 24 from a supply 26 is admitted under pressure into pressure leach vessel 20 in the form of a stream of bubbles. Since mechanical and sparger-type agitators are well-known, the particular mechanical and sparger-type agitators utilized in one preferred embodiment of the pressure leach vessel 20 are not described in further detail. Pressure leach vessel 20 may include additional or alternative components configured to facilitate effective mixing of the materials in leach slurry 22 within vessel 20, together with the proper temperatures and pressures for the desired oxidation reaction.

As one example of a suitable combination of equipment for pressure leach vessel 20, the combination of mechanical and sparger-type agitators has been found to provide a satisfactory degree of agitation to effect the continued dispersion of the molybdenum sulfide particles and also to effect an entrainment of minute bubbles containing free oxygen ($O_2$) to effect oxygen mass transfer to the aqueous slurry. The agitation of leach slurry 22 also promotes a mechanical scrubbing of the particle surfaces for removing any film of molybdenum oxide formed thereon, thereby exposing fresh molybdenum sulfide for further reaction with free oxygen.

As introduced above, the provision of free oxygen into pressure leach vessel 20 may be accomplished in any suitable manner. As one example, oxygen-containing gas 24 may be delivered from oxygen-containing gas supply 26. Exemplary oxygen-containing gases include pure oxygen gas, air/oxygen mixtures, and air, such as naturally occurring air. Oxygen-containing gas 24 may be sparged into pressure leach vessel 20 directly into leach slurry 22. Additionally or alternatively, oxygen-containing gas 24 may be fed to pressure leach vessel 20 into a gaseous portion of the pressure leach vessel and allowed to mix with leach slurry 22 through the action of the mechanical agitators. Sparging oxygen-containing gas 24 into leach slurry 22 may be preferred due to the additional mixing and agitation effected thereby. Other suitable methods of introducing oxygen into pressure leach vessel 20 may alternatively be implemented. Oxygen-containing gas 24 may be provided at any suitable pressure, such as a pressure greater than the pressure in pressure leach vessel 20. In some implementations, oxygen-containing gas 24 may be sparged into leach slurry 22 at about 100 psi overpressure.

FIG. 1 also illustrates that water 28 may be delivered to pressure leach vessel 20 from a suitable supply 30. Water 28 is an example of an acceptable coolant 32 that may be added to pressure leach vessel 20 to maintain the oxidation reaction at a desired temperature and/or pressure. Other suitable coolants may be used as well, including coolants that include water mixed with other components that may be selected to provide additional cooling and/or pressure control effects. Water may be a suitable coolant due to its role in the oxidation reaction that converts $MoS_2$ to $MoO_3$. Coolant stream 32 may be delivered from fresh supply 30 as illustrated and, additionally or alternatively, may be delivered in whole or in part from recycle streams originating in other parts of the process, whether upstream or downstream.

A discharge 34 from pressure leach vessel 20 may be depressurized in a flash tank 36 before proceeding as a leach product stream 38 to a solid-liquid separation stage 40 (step 212). Stage 40 may comprise various apparatus, such as equipment suitable for counter-current decantation, thickening, filtration, and centrifugation.

As indicated above, slurry 22 in the pressure leach vessel 20 may be at pressures greater than about 400 psi and at temperatures greater than about 200° C. (e.g., about 200° C. to about 250° C., preferably about 215° C. to about 235° C.). Depending on the configuration of the solid-liquid separation stage 40, it may be desirable to reduce the temperature and/or pressure of leach product stream 38 prior to entering stage 40. Flash tank 36 is one example of equipment that may be used to accomplish such temperature and/or pressure reductions; other equipment or combinations of components may be similarly implemented.

In accordance with one embodiment of the invention, stage 40 is a counter-current decantation circuit. Suitable counter-current decantation circuits include at least 2 thickeners operated in counter-current mode. The general principles of counter-current decantation are well-known and will not be fully explicated herein. It is sufficient herein to summarize such circuits as including any number of thickeners, generally operated in series and in counter-current mode.

End product streams, or outputs, from stage 40 generally include an overflow liquids fraction 46 (e.g., from a first thickener 42) and a underflow solids product 48 (e.g., from the last thickener 44 in the series), consisting principally of solids. In the context of the present disclosure, stage 40 is implemented to accomplish solid/liquid separation of leach product stream 38. Depending on the condition of leach product stream 38 and other design and implementation options in the present method and system, a CCD circuit may include greater or fewer thickeners as needed to accomplished the desired separation at this stage of the process.

As illustrated in FIG. 1, a portion of liquids fraction 46 from stage 40 may be directed to a solution extraction (SX) circuit 50 while another portion of solid-liquid separation stage liquids fraction 46 may be recirculated or recycled back to pressure leach vessel 20. For purposes of clarity, the portion recycled to pressure leach vessel 20 is referred to herein as a leach recycle stream 52, while the portion directed to solution extraction circuit 50 is referred to herein as an SX feed stream 54.

Relative amounts of liquids fraction 46 that become feed stream 54 and leach recycle stream 52 may vary according to the overall design of the equipment providing the functions of the present invention. Additionally or alternatively, the composition and/or flow rate of leach recycle stream 52 may be adjusted based on the reaction conditions of pressure leach vessel 20, such as to assist in creating the optimal reaction conditions. In some implementations of the present invention, leach recycle stream 52 from overflow 46 may be adapted to improve the reaction kinetics in pressure leach vessel 20. For example, leach recycle stream 52 may improve the reaction kinetics by assisting in maintaining a desired temperature, acid concentration, and/or pressure. Additionally or alternatively, leach recycle stream 52 may improve the reaction kinetics by providing seed material to accelerate the production of precipitates from leach slurry 22. Leach recycle stream 52 may provide a variety of other benefits to the overall methods of the present disclosure. A portion of overflow 46 may additionally or alternatively be fed to feed stream 23 (prior to entering pressure leach vessel 20).

As illustrated in FIG. 1, system 10 may optionally include an ion exchange stage 53. Stage 53 is generally designed to remove metals such as rhenium. In the illustrated embodiment, ion exchange stage 53 is interposed between solid-liquid separation stage 40 and pressure-leach vessel 20, in a recycle loop. However, stage 53 may additionally and/or alternatively be located elsewhere to capture metal values from solid-liquid stage 40. By way of one example, stage 53 is a sulfuric acid ion exchange stage designed to remove rhenium from overflow 46 and/or leach recycle stream 52.

With reference again to FIG. 1, SX feed stream 54 may be filtered in one or more optional filtration stages 56 before proceeding to SX circuit 50. SX circuit 50 may be adapted to extract molybdenum (Mo), rhenium (Re), and/or other metal values (e.g., rare earth metals) from the SX feed stream 54. Overflow 46 may include additional metal values or other compositions that are commercially valuable or otherwise useful in an operator's facility. For example, overflow 46 that becomes SX feed stream 54 may include copper, iron, or other metal values that were contained in the original ore and/or gangue. Depending on the composition of overflow 46, optional filtration stages 56 may be adapted to remove one or more of such metal values or other compositions. Additionally or alternatively, optional filtration stages 56 may be adapted to remove some or all of the relatively invaluable contaminants from overflow 46, such as contaminants that may be remaining from the initial $MoS_2$ supply. In some implementations of the optional filtration stages, the filtrate will continue to SX circuit 50 as SX feed stream 54' with a filter cake 58 being directed to additional process steps, to disposal, or to other uses depending on the composition of the filter cake. As can be understood from the foregoing discussion, a variety of filters and other equipment may be implemented as optional filtration stages 56. As filtration equipment and its operation is well understood, additional description of the various configurations will not be provided herein in the interest of brevity and clarity.

In accordance with one embodiment of the invention, in SX circuit 50, solubilized Mo and Re values are removed from SX feed stream 54 or 54', filter or unfiltered, via traditional solution extraction principles (step 214). Here again, general solution extraction techniques are well known and will not be described in detail; however, specific implementations and sub-steps in utilizing solution extraction at this point in the process to accomplish the results and functions described herein are believed to be not well known. Accordingly, components of SX circuit 50 are described along with at least one example of a method of using solution extraction to accomplish the desired extraction.

With continuing reference to FIG. 1, SX circuit 50 may be implemented and adapted to extract Mo values and/or Re values from an aqueous stage into an organic stage. Additionally, SX circuit 50 may be adapted to leave copper values and/or other metal values in an acidic aqueous stage. As one example of a suitable solution extraction implementation, SX circuit 50 may utilize Alamine® 336, a tertiary amine having the chemical name of tricaprylyl amine, as the organic stage into which the Mo values and/or Re values are extracted. As shown in FIG. 1, an organic feed 60 to SX circuit 50 may be delivered from an organic supply source 62. Additionally or alternatively, organic feed 60 may be delivered from other sources within the facility, such as via a recycle stream from other process steps, such as shown in FIG. 1 as an optional recycle stream 64. Alamine® 336 is one example of a suitable organic feed 60; other suitable organics may be similarly utilized in accordance with this illustrative embodiment, provided they are selected to extract at least one of the Mo and Re values from the aqueous stage. As introduced above, solution extraction circuit 50 may be adapted to leave certain metal values in an aqueous stream 66. As illustrated in FIG. 1, aqueous stream 66 may exit SX circuit 50 and proceed to additional processing apparatus 68 to recover those metal values. As one example, some implementations of the present invention may produce aqueous stage 66 including copper values in an acidic aqueous solution. In such circumstances, aqueous stream 66 may be directed to additional processing facilities 68, such as additional leaching or solution extraction equipment and processes to recover and/or recycle copper and/or acid, each of which may have commercial or methodological advantages to implementers of the present invention.

Continuing with the discussion of the outputs from SX circuit 50, an organic stream loaded with, for example, Mo values and/or Re values may be washed under appropriate circumstances following an initial extraction step. A washed organic stage 70 may be directed to a stripping stage 72, where the loaded organic is stripped with basic solution (e.g., an alkali metal base solution, such as a solution including an alkali metal (e.g., sodium) hydroxide, alkali metal (e.g., sodium or potassium) carbonate or bicarbonate, or an alkaline earth metal base solution, such as a solution including an alkaline earth metal (e.g., calcium) carbonate or bicarbonate) 74 to strip the Mo and/or Re values into the basic solution (step 216). By way of one example, a NaOH solution (about 15% NaOH in aqueous solution) is used as agent 76 for stripping step 216. However, other suitable stripping agents 76 may be used to put the Mo, Re, and/or other values back into an aqueous solution for further processing.

A particular stripping agent 76 used may be selected based on the organic used in the SX circuit 50, on any subsequent processing stages 78 to which a stripped aqueous solution 80 will be subjected, and/or on other factors, such as cost and efficiency. However, alkali metal and alkaline earth metal basic solutions are thought to be particularly advantageous, because they enable relatively lower acid concentrations, and hence less corrosive conditions, to be maintained in the pressure leach vessel 210 and subsequent processing stages. Thus, equipment used for steps 210, 212, 214, and 216 may last longer, and therefore an overall production costs of molybdenum oxide may also be reduced. Subsequent processing stages 78 may include a variety of suitable apparatus adapted to upgrade the rhenium and/or the molybdenum values according to the desired end product. As illustrated in FIG. 1, stripping agent 76 may be provided from a supply tank 82. Additionally or alternatively, stripping agent 76 may be supplied from other sources, such as recycle streams from one or more other process steps operated by the implementers of the present invention. In addition to stripping the desired Mo and/or Re values into the aqueous stage, stripping agent 76 may free the organic stage for other uses, such as optional recycle stream 64 discussed above for use in SX circuit 50. Aqueous alkali metal base including the Mo and Re values may then be further processed for final upgrading of rhenium and molybdenum.

As illustrated, a portion of stripped aqueous stream 80 may be recycled back to pressure leach vessel 20 and/or feed stream 23. Recycling a portion of stream 80 is advantageous because it increases the effective yield recovery of the molybdenum trioxide to the solid phase from system 10 and process 200.

System 10 and process 200 optionally respectfully include an alkali metal (e.g., a sodium) removal apparatus and step 218. An exemplary removal step 218 employs an ion-exchange on a strong cation resin system 83 to remove at least some of the alkali metal ions before recycling a portion stripping discharge 80 to pressure leach vessel 20 or feed stream 23.

Returning now to solid-liquid separation stage 40 described above, underflow 48 and its subsequent processing will be described. Underflow 48 may include a substantial portion of the solids from leach product stream 38. As described above, underflow 48 generally comes from the solids product of the last thickener 44 in the series of thickeners in the stage 40. Additionally or alternatively underflow 48 may include some or all of the solids product of the last thickener 44 together with one or more other components, such as portions of the solids product from upstream thickeners.

Underflow 48 may be directed to a filtration unit 84 (e.g., a CCD filtration unit), which may comprise any suitable combination of components to accomplish the desired filtration. Exemplary configurations of filtration unit 84 include one or more rotating drums, belts, pressure filters, or other conventional filters. A filtrate 86 from unit 84 may be returned to stage 40 as recycle stream 88 and/or may be directed to solution extraction circuit 50 as an SX feed stream 90. Relative proportions of filtrate 86 that are utilized as recycle stream 88 and SX feed stream 90 may be customized by an implementer of the present invention to optimize the use of filtrate 86.

A filter cake 92 from filtration unit 84 may include molybdenum oxide (e.g., a primarily chemical grade oxide (CGO)) product 94. Product 94 may be directly utilized, such as in products, processes, or other uses; may be directly commercialized, such as sold to other entities as a finished product for their use; and/or may be further processed in systems for further refinement to Mo chemicals, such as ammonium dimolybdate (ADM). The various possible uses of product 94 are represented collectively and schematically as additional products 96.

Figure 3:
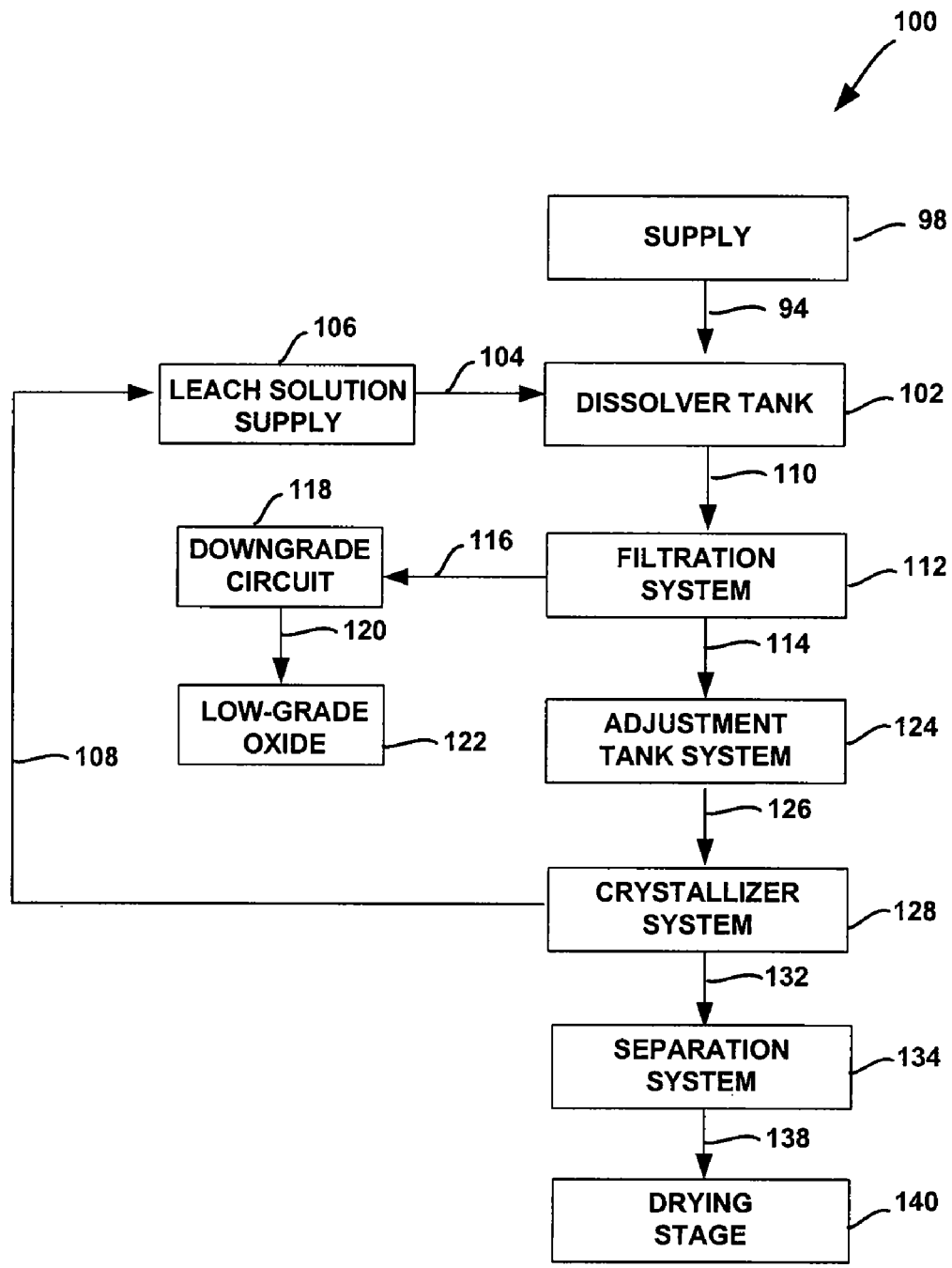
FIG. 3 illustrates a schematic block flow-chart of a system for additional processing of molybdenum oxide.

As one example of additional processing of oxide product 94, wet filter cake 92 from filtration unit 84 described above may be further processed to produce one or more metallurgical products, an ammonium dimolybdate (ADM) product, and the like. A schematic block diagram of a system 100 for producing ADM is illustrated in FIG. 3. System 100 is merely illustrative of the various additional products 96 that may be implemented. As illustrated in FIG. 3, product 94 is delivered to system 100 from a supply 98. When system 100 is in close geographic and temporal proximity to system 10 described above, system 100 may be fluidly coupled to system 10, such that product 94 is delivered to system 100 directly from filtration unit 84. However, system 100 may be offset from system 10 for a number reasons that may lead to storing filter cake 92 from filtration unit 84 for a period of time before supplying cake 92 to system 100. In such circumstances, filter cake 92 may be stored, and in some circumstances shipped, before being utilized as supply 98 shown in FIG. 3. Additionally or alternatively, product 94 illustrated as entering system 100 may be provided from a variety of other sources not limited to production system 10 or process 200 described above.

Regardless of the source of product 94 to system 100, product 94 will commonly be supplied in the form of a wet filter cake; however, product 94 may be in other forms, such as dried and palletized product. Product 94, whether in the form of a wet filter cake or otherwise, is supplied to a dissolver tank 102. Suitable conditions in the dissolver tank 102 will typically include elevated temperatures with some agitation. Such reaction conditions may be maintained through a variety of suitable equipment and component configurations. In dissolver tank 102, product 94 may be batch leached with, e.g., an aqueous solution of ammonium hydroxide ($NH_4OH$) 104 from a source 106 to produce ammonium dimolybdate (ADM), $(NH_4)_2Mo_2O_7$, in solution. Product 94 may also be continuously leached in a similar manner depending on the operating conditions. In some implementations of the present embodiment, system 100 may be adapted to selectively leach product 94 in batch or continuous mode depending on other process conditions.

As suggested by the foregoing discussion, product 94 and ammonium hydroxide 104 react in dissolver tank 102 to produce a leached slurry 110 that is directed from dissolver tank 102 to an ADM filtration system 112. Product 94 may include contaminants and impurities, some of which may not react in dissolver tank 102. Exemplary solid impurities that may be present in product 94 include sulfide minerals and non-hexavalent molybdenum, which may not react in dissolver tank 102. ADM filtration system 112 may be adapted to separate the ADM in an aqueous solution filtrate 114 from contaminants and other materials in a filter cake 116. Various components and subcomponents may be incorporated in filtration system 112 to accomplish the desired separation. One exemplary ADM filtration system 112 includes a continuous belt pressure filter. Filter cake 116 from ADM filtration system 112 may be directed to a downgrade circuit 118, which may consist of two dryers operated in parallel. Other suitable equipment may be included in downgrade circuit 118 to convert filter cake 116 into a downgraded oxide 120. Downgraded oxide 120 may be packaged and sold to customers as a low-grade metallurgical oxide 122 or the like.

ADM filtrate 114 from ADM filtration system 112 may proceed to an adjustment tank system 124, which includes a pH adjustment tank. A discharge 126 from adjustment tank system 124 is directed to a crystallizer system 128.

Returning to crystallizer system 128, crystallizing may be performed in one or more parallel crystallizers operating at an elevated temperature. Additional or fewer crystallizers may be used depending on the configuration of the overall system and the intended feeds and outputs from crystallizer system 128. Similarly, the temperature and other conditions in crystallizer system 128 may be varied to suit the other process configuration variables and the variables that may be present in the feed stream to crystallizer system 128. As illustrated in FIG. 3, crystallizer system 128 may also produce a recycled ammonium hydroxide stream 108, which may be recovered from the vapors leaving crystallizer system 128. Recycled ammonium hydroxide stream 108 from crystallizer system 128 is merely one example of the various efficiencies that may be obtained through recycle streams and other techniques to optimize the system 100.

In addition to the vapor stream/recycled ammonium hydroxide stream 108 produced by crystallizer system 128, a crystallizer output stream 132 may be produced by crystallizer system 128, which output stream 132 may comprise crystals in solution. Crystallizer output stream 132 may be directed to a centrifugal separation system 134. The crystals in solution may be separated from the solution in any suitable manner, with centrifugal separation being a non-limiting example of suitable separation systems.

Accordingly, centrifugal separation system 134 may include two or more types of centrifuges and/or two or more groups of centrifuges dedicated to different separation objectives. With continued reference to FIG. 3, centrifugal separation system 134 may be adapted to produce an ADM product stream 138. After exiting centrifugal separation system 134, ADM product 138 proceeds to an ADM drying stage 140, which may consist of two rotary kiln dryers operated in parallel configuration at a temperature of between about 160° F. and about 170° F. Other suitable equipment and/or conditions may be utilized in ADM drying stage 140. For example, in some systems, it may be desirable to limit the temperature to less than about 175° F.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

The method and system described herein may be implemented to convert molybdenum sulfide into molybdenum oxide. Additionally, the present method and system may be utilized to further refine the oxide to produce low-grade metallurgical oxide and/or ammonium dimolybdate. Additionally, the present method and system may be implemented to isolate copper and/or other metal values from the initial molybdenum sulfide concentrate materials. Other advantages and features of the present systems and methods may be appreciated from the disclosure herein and the implementation of the method and system.

We claim:

1. A method of forming molybdenum oxide from material including molybdenum sulfide, the method comprising the steps of:
   providing a material including molybdenum sulfide;
   pressure leaching the material including molybdenum sulfide to form a pressure leach discharge comprising pressure leach discharge solids and pressure leach discharge liquid;
   separating the pressure leach discharge solids and the pressure leach discharge liquid to form a separated liquid and separated solids comprising molybdenum oxide;
   extracting at least one soluble metal value from the separated liquid to form a loaded stream;
   stripping the loaded stream using a basic solution to form a stripped solution;
   separating a molybdenum value from the stripped solution; and
   recovering the molybdenum value separated from the stripped solution.

2. The method of forming molybdenum oxide from material including molybdenum sulfide of claim 1, further comprising the step of deoiling the material including molybdenum sulfide.

3. The method of forming molybdenum oxide from material including molybdenum sulfide of claim 1, further comprising the step of upgrading the material including molybdenum sulfide.

4. The method of forming molybdenum oxide from material including molybdenum sulfide of claim 1, further comprising the step of recycling a stream of the stripped solution to the pressure leaching of the material including molybdenum sulfide.

5. The method of forming molybdenum oxide from material including molybdenum sulfide of claim 1, wherein the step of extracting at least soluble metal value comprises extracting at least one metal value using an organic stage.

6. The method of forming molybdenum oxide from material including molybdenum sulfide of claim 1, wherein the step of extracting the at least soluble metal value, further comprises a sub-step of extracting at least one additional material.

7. The method of forming molybdenum oxide from material including molybdenum sulfide of claim 6, wherein the sub-step of extracting the at least one additional material comprises extracting at least one of molybdenum, rhenium, and rare earth metal.

8. The method of forming molybdenum oxide from material including molybdenum sulfide of claim 1, wherein the step of extracting soluble metal comprises using a technique selected from the group consisting of solution extraction and ion exchange.

9. The method of forming molybdenum oxide from material including molybdenum sulfide of claim 1, wherein the step of extracting the at least one soluble metal value comprises using solution extraction.

10. The method of forming molybdenum oxide from material including molybdenum sulfide of claim 1, further comprising a step of recycling at least a portion of the separated liquid to the pressure leaching the material including molybdenum sulfide.

11. The method of forming molybdenum oxide from material including molybdenum sulfide of claim 1, further comprising a step of processing the molybdenum oxide to form additional products.

12. The method of forming molybdenum oxide from material including molybdenum sulfide of claim 11, wherein the step of processing the molybdenum oxide to form additional products comprises forming ammonium dimolybdate.

13. The method of forming molybdenum oxide from material including molybdenum sulfide of claim 1, further comprising the step of removing alkali metal ions from the stripped solution.

14. The method of forming molybdenum oxide from material including molybdenum sulfide of claim 1, further comprising the step of removing additional materials from a discharge stream of a solvent extraction process.

* * * * *